United States Patent Office 2,911,786
Patented Nov. 10, 1959

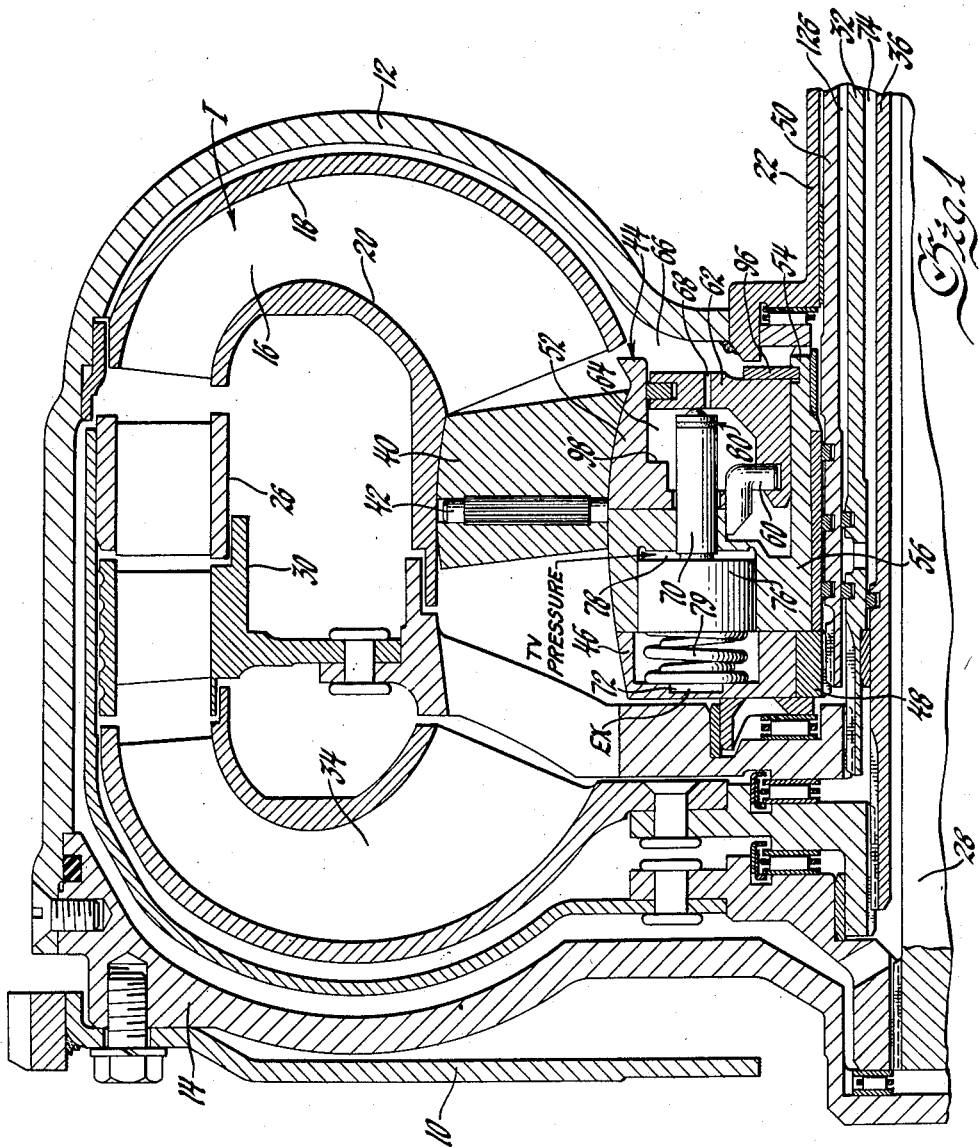

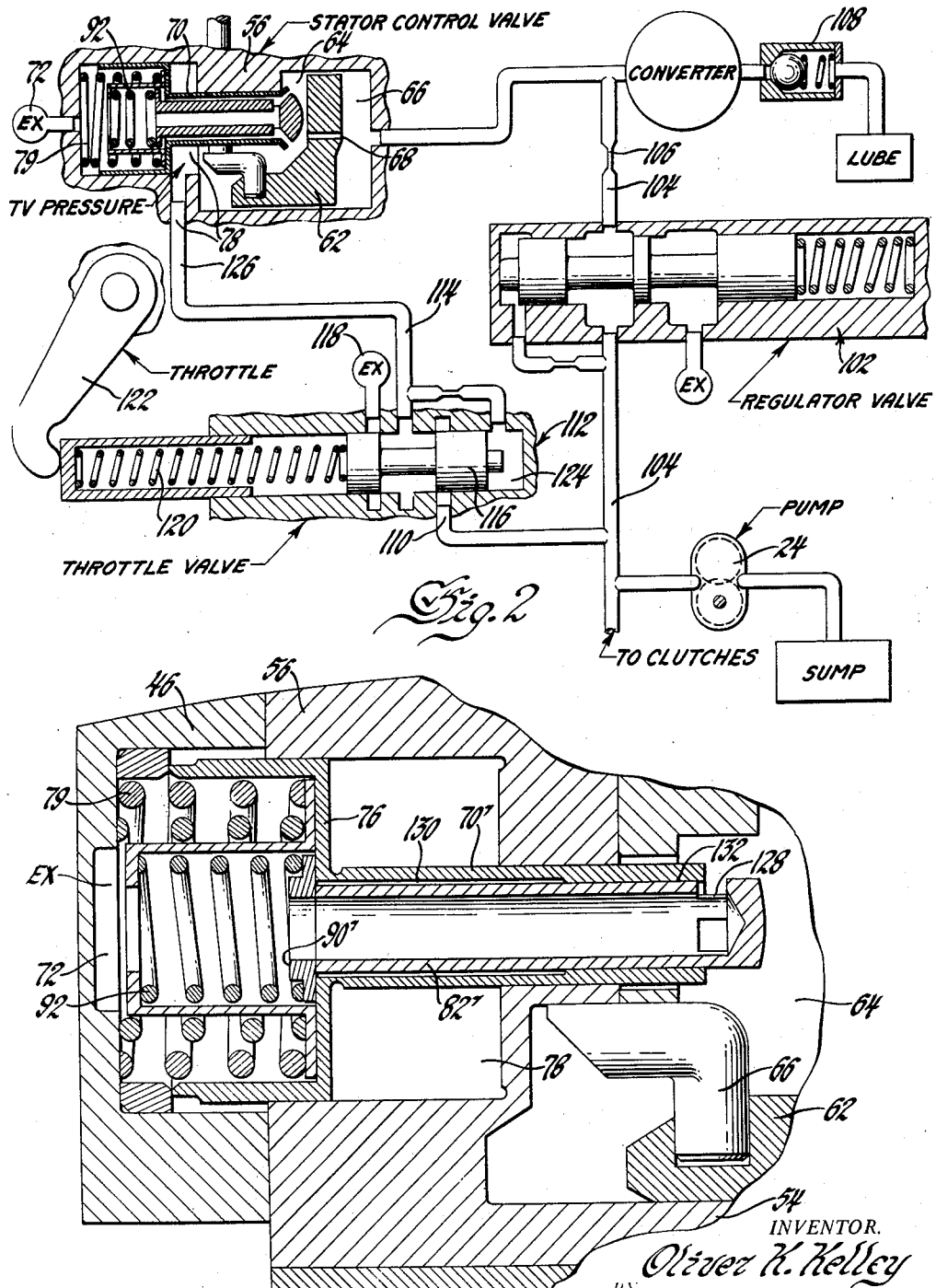

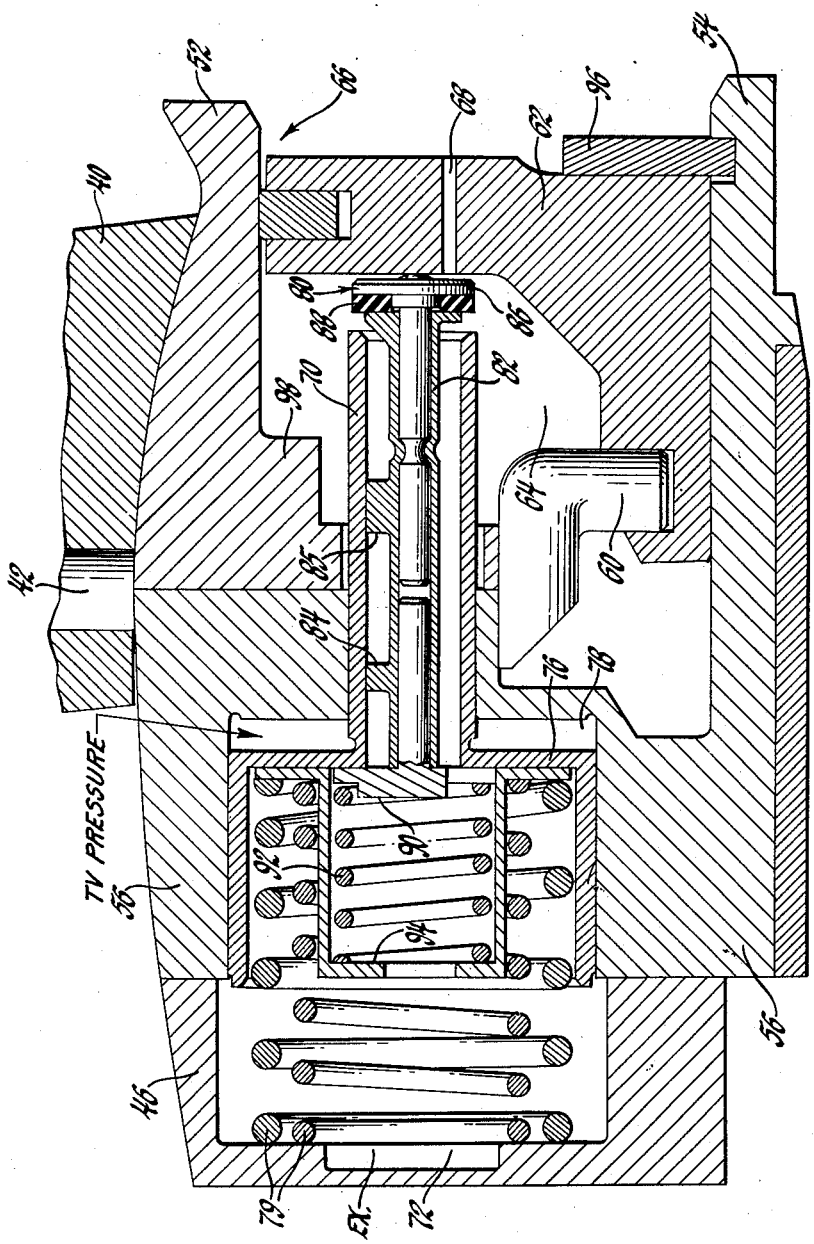

2,911,786

REACTOR BLADE PITCH CONTROL OF A HYDRO-DYNAMIC TORQUE CONVERTER

Oliver K. Kelley, Bloomfield Hills, Mich., assignor to General Motors Corporation, Detroit, Mich., a corporation of Delaware Application July 11, 1957, Serial No. 671,190

13 Claims. (Cl. 60—12)

This invention relates to devices for controlling the angular positions of adjustable blades or vanes in hydrodynamic torque transmitting devices such as torque converters.

In known hydrodynamic torque transmitting devices in general and especially in torque converters which multiply torque, the blades of one or more of the bladed members, such as turbines or reaction members, have been made adjustable so as to vary the torque transmitted from the impeller to the output shaft. In torque converters adjustability increases the range of torque multiplication and where the torque converter is driven by an internal combustion engine this makes possible higher engine speeds with a given load than is possible with non-adjustable blades and hence increases the power output from a given system.

In British Patent 750,788 published June 20, 1956, it is proposed, in a torque converter, to control the position of reaction blades which are individually pivoted on a rotatable support by cranks connected to a piston in the support. The position of the piston and hence the angle of the blades is determined by fluid pressure controlled from outside the torque converter.

In the U.S. patent application S.N. 644,345, filed March 6, 1957, by Kelley, Hause and Swindell it has been proposed variably to position the piston shown in the British patent by constantly supplying pressure fluid to two chambers on opposite sides of the piston and venting one of the chambers through a movable vent closed by the piston itself when the blades are in the desired position.

The present invention provides an improved vent valve structure adapted to be used in the apparatus disclosed in S.N. 644,345 in order to eliminate difficulties and disadvantages which have been encountered in that structure.

In the drawings:

Fig. 1 is one-half of a symmetrical longitudinal or axial section of a torque converter embodying one form of the invention;

Fig. 2 is a diagram of one form of control system for the blade-positioning mechanism shown in Fig. 1;

Fig. 3 is an enlarged section of the vent valve and its accompanying structure shown in Fig. 1; and Fig. 4 is a fragmentary section corresponding to Fig. 3 showing a modified form of vent valve.

Referring to Fig. 1, any suitable engine shaft, not shown, is connected through flywheel 10 to a torque converter casing which includes an outer shell 12 and a front cover 14. The shell 12 is attached to an impeller I, which constitutes an input member and includes blades 16 secured between an impeller shell 18 and a shroud 20. The shell 12 is also secured to a tubular shaft 22 which drives any suitable oil pump schematically represented at 24 in Fig. 2, which supplies oil under pressure to the converter and its associated control mechanism, as is known.

The torque converter also includes any suitable turbines such as a first turbine 26 connected to a drive shaft 28, a second turbine 30 connected to a drive shaft 32 and a third turbine 34 connected to drive shaft 36. The drive shafts are the output members of the torque converter and drive any suitable transmission gearing as is known.

The reaction member, guide wheel or stator includes reaction blades 40 of known form, each rigidly secured to a crank shaft 42 journalled in a stator support designated as a whole by 44 which is bolted to an outer race 46 of a known form of freewheeler which can rotate forward but not backward with respect to a fixed inner race 48 splined to a ground sleeve 50 fixed to the casing of the transmission. The support 44 includes an outer generally cylindrical wall 52 jointed to an inner cylindrical wall 54 by a thick radial wall 56 to form an open-ended annular cylinder. The crank shafts 42 are journalled in wall 56 and each crank shaft has a crank arm 60 disposed in an annular groove in an annular piston 62 which is an adjusting element for the blades. The piston slides in the cylinder formed by the walls 52, 54, 56 and divides the cylinder into two pressure chambers 64 and 66 (Fig. 2) in which fluid pressure is controlled for positioning the stator blades. The converter is constantly charged with liquid under pressure by the pump 24 and the chamber 66 is constantly open to the space within the converter enclosed by shell 12 and cover 14 so that the converter pressure always urges the piston 62 forward, that is, toward the left as Fig. 1 is seen. In its extreme left-most position the piston holds the reaction blades in their position of highest angle. Consequently the chamber 66 is called the high angle control chamber. In this position the blades make the greatest change in the tangential direction of oil flowing from the turbines to the impeller and consequently effect the greatest range of torque multiplication.

Pressure in chamber 64, called the low angle control chamber, can oppose movement of the piston due to converter pressure and hold the blades at lower angles. The quantity and pressure of oil in the low angle control chamber 64 can be controlled to hold the blades in any desired position. Oil at converter pressure is constantly supplied, at a restricted rate of flow, to the low angle control chamber, for example through the small passage 68 in the piston 62. Therefore pressure in the chamber 64 can stop movement of the piston to the left but can never by itself move the piston to the right because the pressure in the chamber 64 can never exceed the pressure in chamber 66. The blades 40 may have a larger area on the downstream side of the shaft 42 than on the upstream side, the downstream side being the right hand side of the shaft as seen in Fig. 1. If so, the hydraulic force of oil circulating in the torque converter constantly urges the blades to low angle, that is urges the piston to the right. The apparatus is so proportioned that when there is no pressure in the low angle chamber 64 the pressure maintained in the converter and high angle chamber 66 is sufficient to overcome any hydrodynamic force on the blades 40 and move the blades to their highest angle and this can occur throughout the entire operating range of the torque converter.

At some value of pressure in the low angle chamber 64 less than the pressure in high angle chamber 66, the force on the piston 62 of the pressure in chamber 64, plus the hydraulic force on the blades 40 equals the force on the piston of pressure in chamber 66 and this holds the blades in one particular position.

Whenever the chamber 64 is vented the converter pressure in chamber 66 can force oil from chamber 64 and move the piston to the left to increase the angle of the blades. This invention is particularly concerned with the mechanism for venting the chamber. This mechanism, as shown structurally in Fig. 1 and diagrammatically in Fig.

2, includes a vent tube 70 slidable in a bore in the thick wall 56 and adapted to connect the low angle control chamber 64 with a space at atmospheric pressure within the transmission case. This connection may be established through the interior of the tube 70 and vent space 72 which communicates through any suitable passages, not shown, to the vent passage formed by the annular space 74 between shafts 32 and 36.

As shown best in Fig. 3 the vent tube 70 is formed integral with a piston 76 slidable in a control cylinder 78, called a throttle pressure control chamber, formed in the thick radial wall 56 and in the free wheeler race 46. The piston 76 is open at its forward or left end to the vent space 72. The piston and tube 70 are urged to the right by one or more springs 79. The vent tube 70 carries a vent valve 80 including a stem 82 longer than the tube 70 and slidably supported in the tube by three circumferentially spaced guides 84 and three similar guides 85 which do not prevent flow through the tube. At one end the stem 82 carries a valve including a cap or plate 86 and gasket 88 which can close the end of the tube 70. At its other end the stem 82 is fixed to a perforated stop 90 urged to the right by a light spring 92 seated in a cup 94.

The springs 79, which are stronger than spring 92, urge the piston 76 to the right and support the cup 94 against the face of the piston, and the spring 92 urges the stem 82 to the right to open the valve 80. When the valve is open, pressure in high angle control chamber 66 moves the piston 62 to the left until the piston pushes the valve 80 to the left against the force of spring 92 to close the end of the vent tube. This stops venting and prevents further movement of the piston toward high angle position.

The structure includes means for positioning the tube 70 to close the vent and hold the stator blades in any desired position, either manually or automatically in accordance with operating conditions. The tube 70, being constantly urged to the right by spring 79, may be urged to the left against the force of this spring by pressure in chamber 78 which thus determines the position of the tube 70 and determines the position of the stator blades as will now be explained.

Suppose that the pressure in chambers 64 and 66 is equal, that there is no pressure in throttle pressure control chamber 78 and that the piston is held to the right against the stop ring 96 by the hydraulic force on the blades 40. The blades are now at lowest angle. The spring 79 presses the tube 70 as far as it will go to the right, that is until the cap 86 is against the piston and the gasket 88 closes the tube. If it is desired to increase the angle of the stator blades fluid under pressure is admitted to the throttle chamber 78. This pressure moves the tube 70 to the left against the spring 79 and to some particular position corresponding to the pressure. Spring 92 opens valve 80. This allows oil to flow from the chamber 64 faster than it can be supplied through the passage 68 in the piston and this vents the chamber 64 or reduces its pressure so that pressure in the chamber 66 moves the piston to the left as fast as the outflow of oil will permit, until the piston again closes the valve 80. This closes the vent line and stops further flow of oil from the chamber 64 and this holds the piston against the valve 80.

Maintaining the piston in any particular position requires maintaining the pressure in chamber 64 at a sufficient value below the pressure in the converter so that the force on the left-hand side of the piston due to the pressure in chamber 64, plus the force on the blades 40 just balances the force of converter pressure on the right of the piston. The force on the blades 40 depends upon the angle of blades, the speed of rotation of the impeller and other factors.

After the vent into tube 70 is closed by the piston 62, oil flowing into chamber 64 through opening 68 begins to increase the pressure in chamber 64 toward the value of converter pressure. When the sum of the forces of the pressure in chamber 64 on piston 62 and the hydrodynamic force on the blades 40 exceeds the force of pressure in chamber 66 on the piston 62, the piston will move away from the tube 70 which remains held by the spring 79 and pressure in throttle control chamber 78. This cracks the vent which then again reduces the pressure in chamber 64 and permits the converter pressure to return the piston to its position against the valve 80. The piston thus holds or hovers in a narrow range of movement between complete closing and slight opening of the vent tube 70 and this holds the stator blades 40 in a position determined by the tube 70 which, as previously explained, is determined by the pressure in chamber 78. In order to increase the angle of the blades 40 and thereby increase the performance or range of torque multiplication of the torque converter, the pressure in chamber 78 is increased in any suitable manner, and conversely to decrease the stator blade angles the pressure in chamber 78 is reduced. When the pressure is reduced the springs 79 urge the valve 80 against the piston 62 more firmly and assure closing of the vent tube 70. This allows pressure in chamber 64 to build up to equal pressure in chamber 66, and when this occurs, the hydraulic force on the blades 40 moves them, and the piston 62 toward low angle position. The spring 79 causes the vent tube 70 to follow the piston 62 and hold valve 80 closed until the piston 76 takes a new stable position determined by the reduced pressure in chamber 78, after which the valve 80 regulates the pressure in chamber 64 to hold the blades in the new position as discussed above.

In order to hold the stator blades 40 at highest angle without closing the vent valve 80 a stop 98 is formed in the chamber 64 which prevents the piston 62 from closing the valve 80 whenever the tube 70 and piston 76 are held fully to the left as Fig. 3 is seen. The piston 76 is prevented from moving to the right far enough to prevent the entrance of pressure fluid to chamber 78 when the piston 62 is fully to the right against the stop 96 and valve 80 is closed. This may be accomplished by any suitable means for example by selection of the length of stem 70 which holds the piston 76 far enough to the left to maintain communication between chamber 78 and its supply conduit whenever there is no pressure in cylinder 78.

The stator blades can be positioned manually at the will of the driver but it is preferred to position them automatically in response to torque demand on the engine, for example by means of the control system illustrated in Fig. 2.

*Control system*

Referring to Fig. 2, when the engine is running the pump 24 constitutes a constant source of fluid under pressure, which pressure may be held constant by any suitable known pressure control valve 102. This constant pressure may be supplied to a main line 104 which supplies the usual clutches in the gearing driven by the output shaft 28, 32, 36, and it is also connected to the converter working space and to the chamber 66 through a choke 106. Oil may be constantly discharged from the converter through a pressure relief valve 108 to the intake of the pump 24 or to the lubrication system of the transmission, as is known. The restricted supply through the choke 106 and the pressure-responsive discharge valve 108 together can maintain a substantially constant static pressure in the converter and in high angle control chamber 66 as is known, which pressure may be for example 30 pounds per square inch. The main line 104 is also connected to the inlet 110 of a throttle pressure regulating valve 112 which takes in oil at line pressure (for example 80 pounds per square inch), and delivers oil to a throttle pressure control line 114 at a pressure which is measured by the amount of opening of the throttle of the engine which drives the car. This may be accomplished by any known device such as the valve stem 116 urged constantly to open the inlet 110 and close an exhaust port 118 by a spring 120, the loading of which is increased as the throttle is opened, by an arm 122 connected to the throttle of the engine. The valve stem is urged in the opposite direction to close the inlet 110 and open the exhaust port 118 by the pressure of oil in the pressure control line 114 exerted in chamber 124.

The throttle regulated pressure in line 114 is conducted to the throttle pressure regulating chamber 78 by a conduit which includes the annular space 126 in Fig. 1 between the shaft 32 and ground sleeve 50 which annular space communicates with the chamber 78 by any suitable passages, not shown.

Since the angular position of the stator blades 40 is determined by the pressure in throttle control chamber 78 and since this pressure is measured by the amount of throttle opening which is a known measure of torque demand on the engine the stator blades will be positioned to provide a range of torque multiplication which is measured by the torque demand on the engine.

*Modification*

Fig. 4 shows a modified construction of the vent valve described above. In this modified form the structure is as described in connection with Figs. 1 and 3 with the exception of the vent valve and vent tube. The piston 76 is formed integral with a modified vent tube 70' in which is slidably mounted a sleeve valve 82' urged to the right as Fig. 4 is seen by a cap or stop 90' and spring 92. When the stop 90' is against the piston 76 the end of the tube 82' is beyond the end of the tube 70' so that a port 128 establishes communication between the cylinder 64 and vent space 72 through the interior of the tube 82'. When the piston 76 is in any intermediate position sufficiently to the right of that shown in Fig. 4 the piston 62 can close the vent line from chamber 64 by moving the tube 82' into the tube 70' to occlude the port 128, the right end of the tube 82' being closed, as shown.

The tube or guide 70' has a counterbore 130 extending throughout most of its length to provide relatively short bearing surface 132 for the tube 82' in order to reduce sliding friction.

The structures of this invention have advantages over previously known structures proposed for controlling stator blades such as those in the general arrangement described in the British Patent 750,788 and S.N. 644,345, referred to. One of the difficulties of successfully operating a control of this type arises from the necessity for precise control and the desirability of positioning stator blades always at the same angle in response to the same torque demand both when the torque demand has increased and when it has decreased. In structures heretofore proposed it has been difficult to accomplish this due to the inherent limitations of the dimensions of the apparatus and to resulting friction and in particular to variation in friction under different operating conditions, such as temperature, cleanliness of the oil or age of the structure.

The diameter of the stator support 44 within which the entire stator control structure must be contained is of the order of 4 inches in a typical torque converter for automobiles. As a practical matter this limits the radial thickness of the annular piston 62 to about one inch, and this imposes severe requirements on the design of the vent tube and its associated mechanism. In the structure described, the diameter of the throttle control chamber 78 is made as large as the limitations of the apparatus will permit in order to exert as much force as possible by the throttle pressure. This is balanced by a corresponding large force in the spring 79. On the other hand, the tube 70 is made as small in diameter as possible which both contributes to the large area of the piston 76 and reduces the friction area of contact between tube 70 and stem 82 or between tube 70' and tube 82'. Likewise, the spacers 84 and 85 and the counterbore 130 further reduce the friction area between these moving parts. By having a strong spring 79 balanced by correspondingly high pressure in the chamber 78 the value of the difference in forces which will move the tube 70 or 70' a given distance is relatively large with respect to the friction encountered. This maintains a safe margin of excess of the adjusting force over the sliding friction. This tends to increase the accuracy with which the tube 70 or 70' is positioned in response to pressure in the chamber 78 regardless of whether this pressure has increased or decreased. Likewise, the relatively small frictional area between the tubes 70 or 70' and the stem 82 or 82' reduces the likelihood of changing position of the tube 70 or 70' when the piston 62 moves the stem 82 or 82'.

Another advantage of the invention is that it eliminates chafing and damage of the vent valve 80 or its seat due to rotation of the piston 62 with respect to the cylinder 58. Due to the cranks 60 there is a slight rotary movement between the piston 62 and the support 44 when the piston strikes the valve 80 at some positions of the tube 70. In the construction of this invention the valve is incapable of any tangential motion and therefore cannot be dragged across its seat by the piston. The cap 86 of Fig. 3 and the closed end of the tube 82' of Fig. 4, both ordinarily made of metal, permit sliding of the piston over the valve due to this rotary motion without any damage to the valve or to its seat.

I claim:

1. A torque converter comprising in combination turbine means connected to drive an output shaft; reaction blades disposed in a group surrounding the shaft; an impeller for circulating liquid through the turbine and reaction blades; a tube surrounding the shaft for supporting the reaction blades; an annular cylinder rotatably supported on the tube and including a pair of spaced cylindrical walls joined by an annular radial wall; crank shafts for the reaction blades journalled in the cylinder; a first piston slidable in the annular cylinder for positioning the crank shafts and enclosing a pressure-responsive control chamber within the cylinder; means for urging the piston in one direction; means for admitting fluid under pressure to the control chamber for opposing the urging means; and means for venting the control chamber including a bore of relatively small diameter in the radial wall, a vent tube slidable in the bore, a second piston of relatively large diameter connected to the vent tube and disposed in a second cylinder of relatively large diameter with respect to the bore formed in the radial wall, spring means for urging the vent tube toward the first piston, means for admitting pressure fluid to the second cylinder for opposing the spring, a valve carried by the vent tube adapted to be closed by the first piston, and means carried by the vent tube normally urging the valve open.

2. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in position to provide other torque transmitting conditions, means for supplying to the chamber fluid under pressure to oppose the urging means, a conduit having a movable inlet for venting the chamber, means for closing the inlet in response to the position of the adjusting element and means normally urging the closing means open.

3. In a hydrodynamic device for transmitting torque from an input member to an output member in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure to oppose the urging means, a movable vent conduit for the chamber and a normally open valve carried by the vent conduit, the valve being adapted to be closed by the adjusting element.

4. In a hydrodynamic device for transmitting torque from an input member to an output member in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure to oppose the urging means, a movable vent conduit for the chamber, a normally open valve carried by the vent conduit, and means for closing the valve in response to the position of the adjusting element.

5. In a hydrodynamic device for transmitting torque from an input member to an output member in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure to oppose the urging means, a movable venting member for the chamber, a valve slidable in the venting member for permitting or preventing communication between the chamber and venting member and adapted to be closed by the adjusting element, and means normally urging the valve open.

6. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure to oppose the urging means, a movable venting member for the chamber, means for positioning the venting member, a valve carried by the venting member adapted to close the venting member by contact with the adjusting element when the adjusting element is positioned to correspond with the position of the venting member, and means urging the valve open.

7. In a hydrodynamic torque converter for transmitting torque from an input member to an output member, in combination, means including a movable adjusting element for varying the range of torque multiplication between the input and output members, the torque converter including means for urging the adjusting element toward a first position providing a high range of torque multiplication, a fluid pressure chamber for opposing the urging means and holding the adjusting element in positions providing lower ranges of torque multiplication, means for supplying to the chamber fluid under pressure to oppose the urging means, a movable venting member for the chamber, means for positioning the venting member according to torque demand on the input member, a valve carried by the venting member adapted to close the venting member by contact with the adjusting element when the adjusting element is positioned to provide a range of torque multiplication corresponding to the torque demand on the input member.

8. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure sufficient to oppose the urging means, a movable venting member for the chamber in the path of the adjusting element, means for positioning the venting member, a valve stem slidable in the venting member, and a valve carried by the stem adapted to close the venting member upon contact with the adjusting element.

9. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure sufficient to oppose the urging means, a movable venting member for the chamber in the path of the adjusting element, means for positioning the venting member, a valve stem slidable in the venting member, a valve carried by the stem adapted to close the venting member upon contact with the adjusting element and means urging the valve open.

10. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure sufficient to oppose the urging means, a venting tube for the chamber, movable axially in the path of the adjusting element, means for positioning the venting tube, a valve stem slidable in the venting tube, a valve carried by the stem adapted to abut the end of the venting tube upon contact with the adjusting element and means urging the valve away from the end of the tube and toward the adjusting element.

11. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, a fluid pressure chamber for opposing the urging means and holding the adjusting element in positions to provide other torque transmitting conditions, means for supplying to the chamber fluid under pressure sufficient to oppose the urging means, a venting tube for the chamber movable axially in the path of the adjusting element, means for positioning the venting tube, a sleeve valve slidable in the venting tube and having a port adapted to establish communication between the chamber and the tube, and means normally urging the sleeve valve open, the sleeve valve being adapted to occlude the port when the valve contacts the adjusting element.

12. In a hydrodynamic device for transmitting torque from an input member to an output member, in combination, means including a movable adjusting element for varying the torque transmitted between the input and output members, the torque transmitting device including means for urging the adjusting element toward a first position providing one torque transmitting condition, an expansible chamber motor for opposing the urging means and holding the adjusting element in positions to provide other torque transmitting condition, means for supplying to the chamber fluid under pressure sufficient to overcome the urging means, a conduit having an inlet movable in the path of the adjusting element for venting the expansible chamber, the inlet being adapted to be closed in response to the position of the adjusting element, and means for adjusting the position of the inlet of the venting conduit both within and beyond the path of the adjusting element.

13. In a hydraulic torque converter for transmitting torque from an input member to an output member in combination, means including a movable adjusting element for varying the range of torque multiplication between the input and output members, the torque converter including means for urging the adjusting element toward a position providing a high range of torque multiplication, a fluid pressure chamber for opposing the urging means and holding the adjusting element in positions providing lower ranges of torque multiplication, means for supplying to the chamber fluid under pressure to oppose the urging means, a movable venting member for the chamber, means for positioning the venting member according to torque demand on the input member, the venting member being adapted to be closed in response to the position of the adjusting element and a stop for the adjusting element to prevent closing of the venting member when the venting member is in position of high torque demand.

References Cited in the file of this patent

FOREIGN PATENTS

| | | |
|---|---|---|
| 444,171 | Great Britain | Mar. 16, 1936 |
| 750,788 | Great Britain | June 20, 1956 |